(12) United States Patent
  Hsu (10) Patent No.: US 10,816,920 B1
(45) Date of Patent: Oct. 27, 2020

(54) FIXING MEMBER AND PROJECTOR

(71) Applicant: Coretronic Corporation, Hsin-Chu (TW)

(72) Inventor: Kun-Chen Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/516,266

(22) Filed: Jul. 19, 2019

(51) Int. Cl.
  *G03G 15/20* (2006.01)
  *G03B 21/14* (2006.01)

(52) U.S. Cl.
  CPC ........... *G03G 15/20* (2013.01); *G03B 21/145* (2013.01)

(58) Field of Classification Search
  CPC combination set(s) only.
  See application file for complete search history.

(56) References Cited

U.S. PATENT DOCUMENTS

| 6,639,741 B2 | 10/2003 | Wagner | |
|---|---|---|---|
| 2003/0210479 A1* | 11/2003 | Watanabe | G02B 7/02 359/823 |
| 2008/0297690 A1* | 12/2008 | Kusukame | G02F 1/3558 349/61 |

FOREIGN PATENT DOCUMENTS

TW    I317824    12/2009

* cited by examiner

*Primary Examiner* — Victor Verbitsky
(74) *Attorney, Agent, or Firm* — JCIPRNET (57) ABSTRACT

A fixing member adapted to fix a first optical member and a second optical member is provided, the fixing member is disposed between a first module and a second module. The fixing member includes a frame body, a first fixing structure and a second fixing structure. The frame body is fixed to the first module. The first fixing structure is connected with the frame body and configured to fix the first optical member to the first module. The second fixing structure is connected with the frame body and configured to fix the second optical member to the second module. A projector comprising the fixing member above is further provided.

15 Claims, 12 Drawing Sheets

FIXING MEMBER AND PROJECTOR

BACKGROUND

Technical Field

The disclosure relates to a fixing member and a projector, and more particularly to a fixing member adapted to fix two optical members and a projector comprising the fixing member.

Description of Related Art

Currently, an optical member is fixed to a corresponding module by at least one fixing member. When number of the optical member is plural, it needs more fixing members to fix those optical members to the corresponding modules, so that production cost and working time of fixing procedure are consumed.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides a fixing member adapted to fix two optical members.

The disclosure provides a projector which comprises the fixing member described above.

In order to achieve one, part, or all of the objectives or other objectives, an embodiment of the disclosure provides a fixing member adapted to fix a first optical member and a second optical member, wherein the fixing member is disposed between a first module and a second module, and the fixing member includes a frame body, a first fixing structure and a second fixing structure. The frame body is fixed to the first module. The first fixing structure is connected with the frame body and configured to fix the first optical member to the first module. The second fixing structure is connected with the frame body and configured to fix the second optical member to the second module.

An embodiment of the disclosure provides a projector, including an illumination system, a light valve and a projection lens. The illumination system is configured to provide an illumination beam. The light valve is disposed on a transmission path of the illumination beam and configured to convert the illumination beam into an image beam. The projection lens is disposed on a transmission path of the image beam and configured to project the image beam out of the projector. The illumination system includes a light source assembly and an optical device. The light source assembly is configured to provide a light source beam. The optical device is disposed between the light source assembly and the light valve, wherein the optical device includes a first module, a second module, a first optical member, a second optical member and a fixing member. The second module is fixed to the first module. The first optical member is disposed at the first module. The second optical member is disposed at the second module. The fixing member is disposed between a first module and a second module, wherein the fixing member includes a frame body, a first fixing structure and a second fixing structure. The frame body is fixed to the first module. The first fixing structure is connected with the frame body and configured to fix the first optical member to the first module. The second fixing structure is connected with the frame body and configured to fix the second optical member to the second module.

In an embodiment of the disclosure, the illumination system further includes a wavelength conversion device disposed on a transmission path of the light source beam, and the wavelength conversion device converts the light source beam into a converted beam.

In an embodiment of the disclosure, the optical device is disposed between the light source assembly and the wavelength conversion device.

In an embodiment of the disclosure, the illumination system further includes at least one of an optical filter and a light homogenizing element disposed on a path of the converted beam so as to form the illumination beam.

In an embodiment of the disclosure, the at least one of the optical filter and the light homogenizing element is disposed between the wavelength conversion device and the optical device.

In an embodiment of the disclosure, the optical device is disposed between the wavelength conversion device and the at least one of the optical filter and the light homogenizing element.

In an embodiment of the disclosure, the first module includes a first concave portion, the fixing member is fixed to a portion of the first module beside the first concave portion, and the first optical member is located in the first concave portion and is pressed by the first fixing structure.

In an embodiment of the disclosure, the frame body is attached to a surface of the first module beside the first concave portion, the frame body forms an opening corresponding to the first concave portion, the first optical member is accommodated in the first concave portion and exposed by the opening, the first fixing structure further includes at least one first arm extending from the frame body to the opening so as to press the first optical member.

In an embodiment of the disclosure, the second module includes a second concave portion, and the second optical member is located in the second concave portion and is pressed by the second fixing structure.

In an embodiment of the disclosure, the frame body forms an opening, the second fixing structure includes at least one second arm extending from the frame body and bending so as to form a pressing portion to press the second optical member.

In an embodiment of the disclosure, the first optical member includes a lens, a prism, an optical filter or a light diffusion element.

In an embodiment of the disclosure, the second optical member includes a lens, a prism, an optical filter or a light diffusion element.

Based on the above, the fixing member disposed between the first module and the second module is adapted to fix the first optical member and the second optical member to the first module and the second module by the first fixing structure and the second fixing structure. Compared to the conventional device which needs two fixing members to fix the first optical member and the second optical member to the first module and the second module respectively, the single fixing member of the invention can fix the first optical member and the second optical member to the first module and the second module at the same time so that production cost and working time of fixing procedure can be saved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
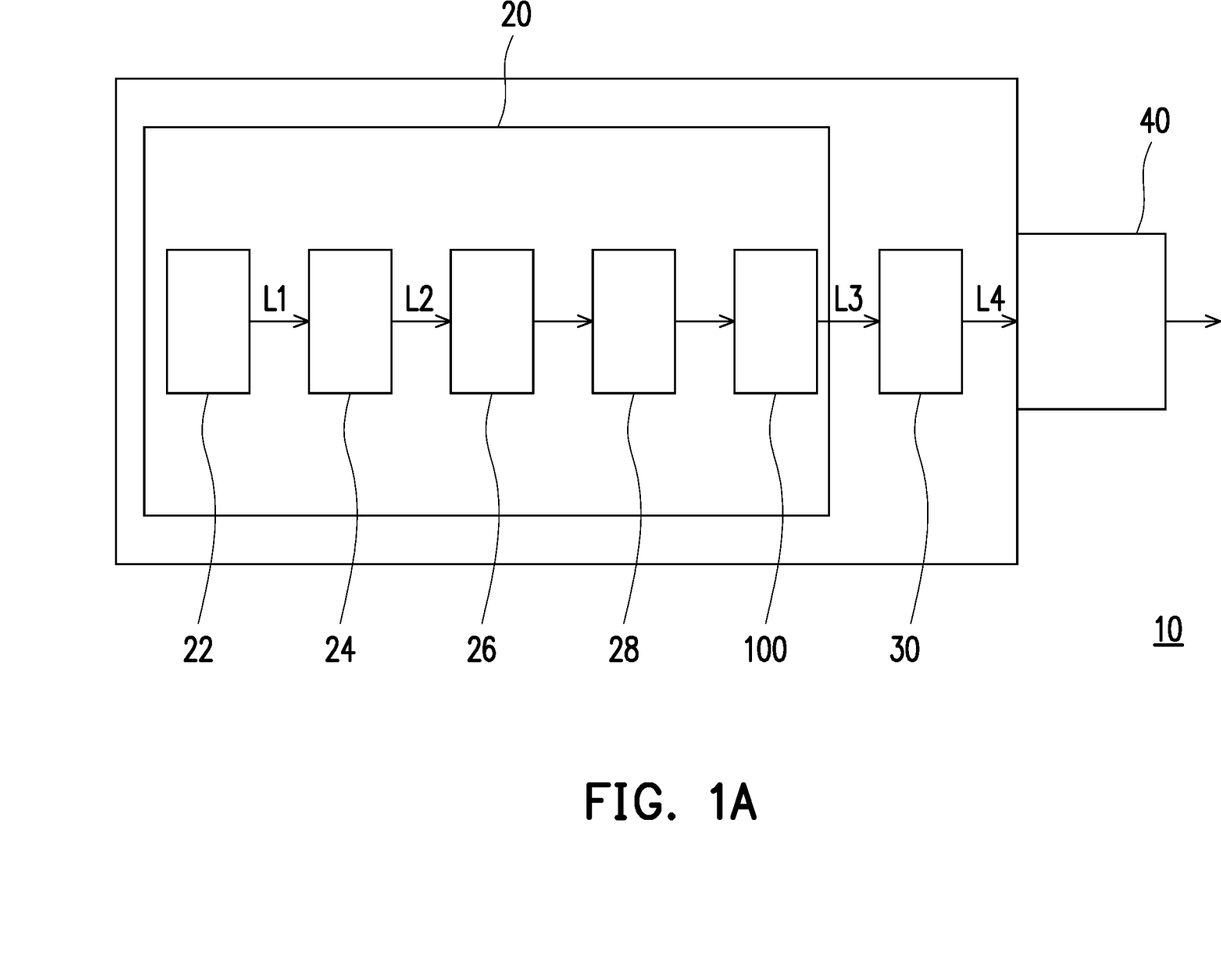
FIGS. 1A-1D are schematic views of projectors in accordance with several embodiments of the disclosure.
Figure 1B:
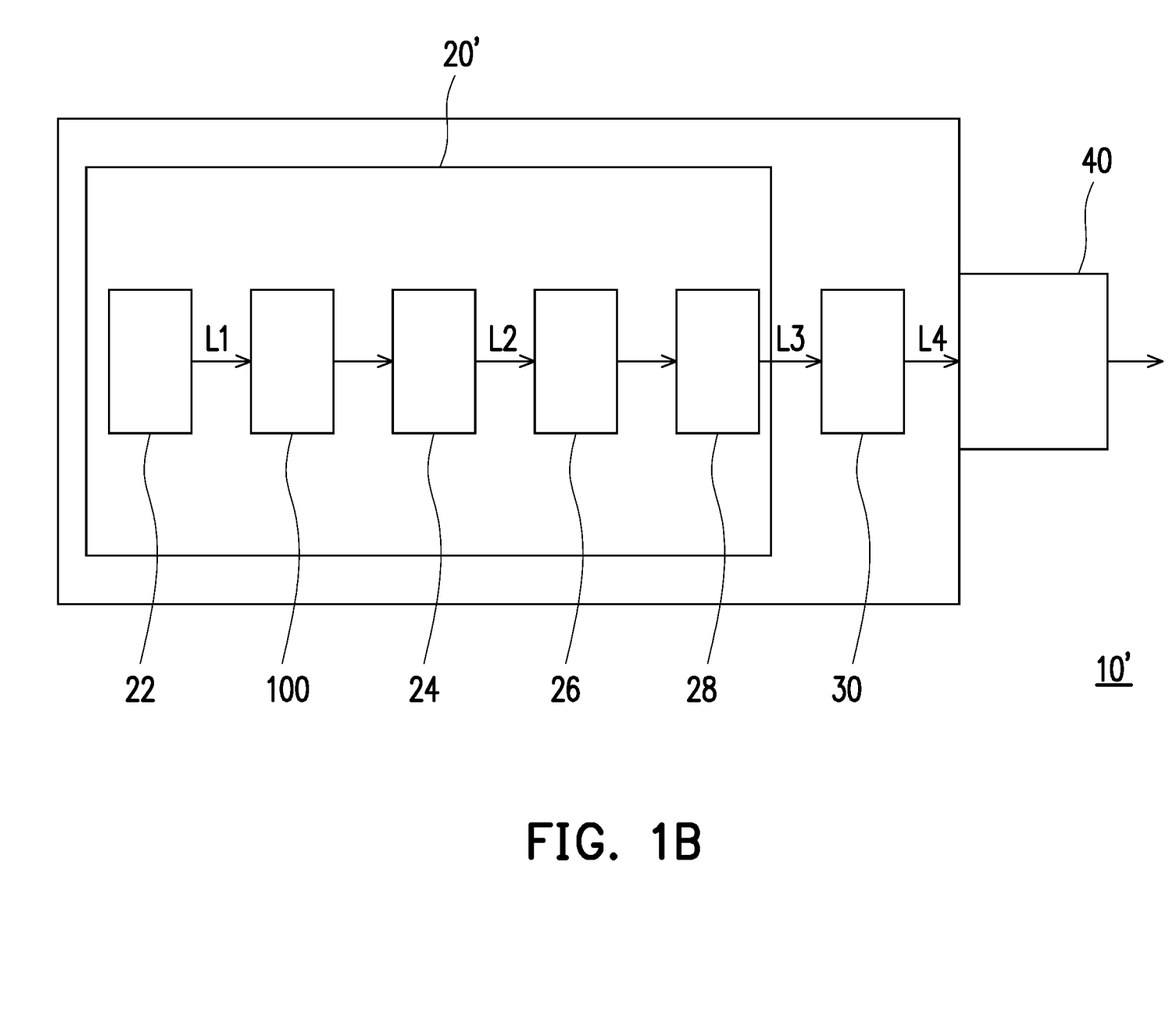
Figure 1C:
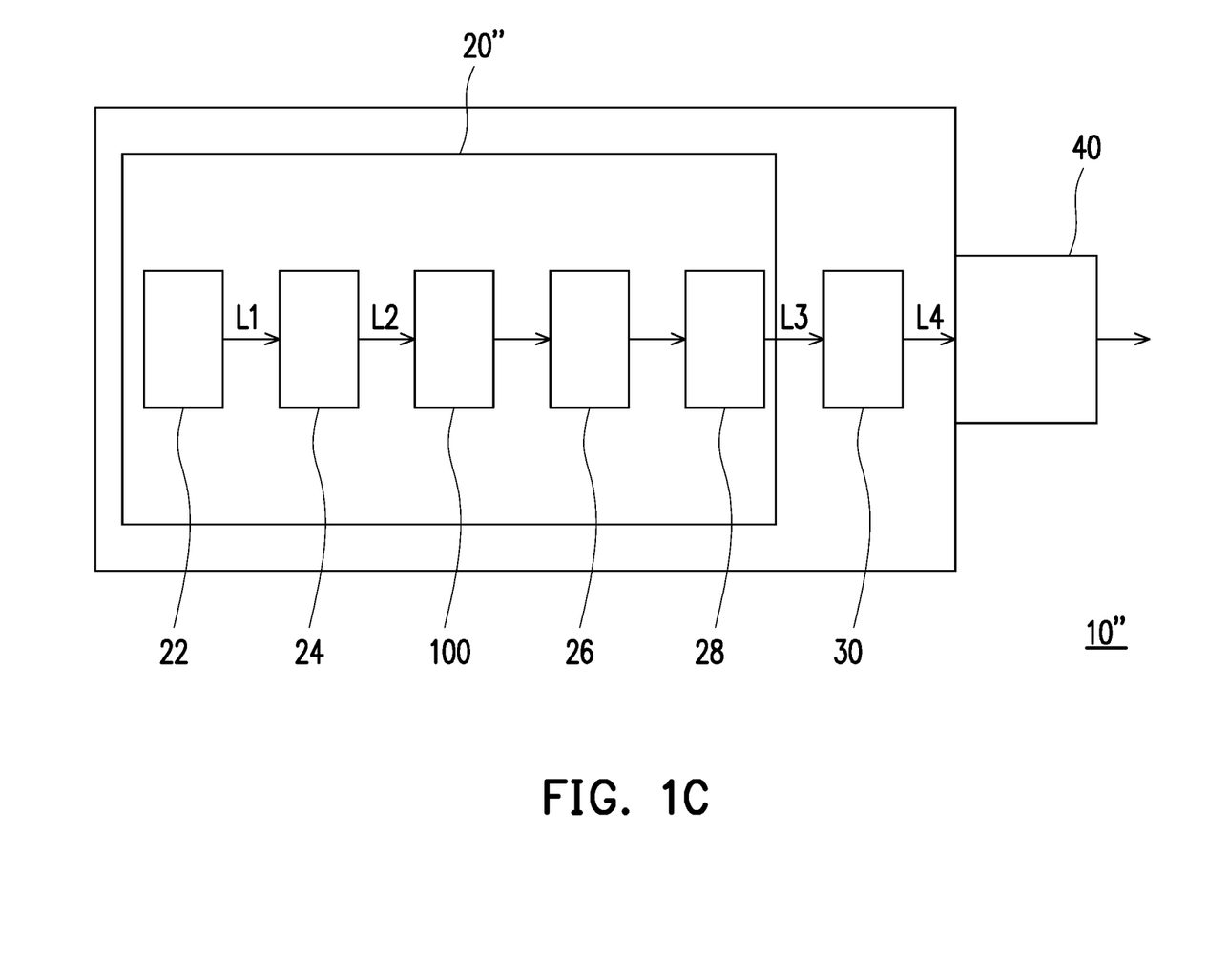

FIGS. 1A-1C are schematic views of projectors in accordance with several embodiments of the disclosure. Please refer to FIG. 1A, in the embodiment, a projector 10 includes an illumination system 20, a light valve 30 and a projection lens 40.

The illumination system 20 is configured to provide an illumination beam L3, wherein the illumination system 20 includes a light source assembly 22 and an optical device 100. The optical device 100 is disposed between the light source assembly 22 and the light valve 30. The light source assembly 22 is configured to provide a light source beam L1. In the embodiment, the light source assembly 22 is, for example, a solid-state illumination source such as a laser light source, but in other embodiments, the light source assembly 22 may also be other solid-state illumination source such as a light emitting diode or other light sources. A light source beam L1 emitted by the light source assembly 22 is, for example, blue light, but may also be a light beam of other colors, and the disclosure is not limited herein. In addition, the light source assembly 22 may include, for example, a plurality of laser elements (not shown). The laser elements are arranged, for example, in an array. The laser element is, for example, a laser diode (LD). In other embodiments, the light source assembly 22 may also be multiple.

In an embodiment, the illumination system 20 further includes a wavelength conversion device 24 disposed on a transmission path of the light source beam L1, and the wavelength conversion device 24 converts the light source beam L1 into a converted beam L2 with a main wavelength different from a main wavelength of the light source beam L1. The wavelength conversion device 24 may be, for example, a phosphor wheel. For example, the wavelength conversion device 24 includes two sections. The first section of the wavelength conversion device 24 has at least one of phosphor layer. The phosphor layer is adapted to convert a blue light source beam L1 into a converted beam L2 with another color. The second section of the wavelength conversion device 24 may be a transparent plate or an opening. The light source beam L1 may pass the second section of the wavelength conversion device 24. In the other embodiment, the second section of the wavelength conversion device 24 may be a reflective layer. The light source beam L1 illuminates the second section, and then the light source beam L1 is reflected, by the reflective layer, to be transmitted to an optical filter 26. The disclosure is not limited herein.

In addition, in an embodiment, the illumination system 20 further includes at least one of the optical filter 26 and a light homogenizing element 28 disposed on a path of the converted beam L2 so as to form the illumination beam L3. In an embodiment, the at least one of the optical filter 26 and the light homogenizing element 28 is disposed between the wavelength conversion device 24 and the optical device 100. The light homogenizing element 28 may include a light integration rod or lens array, but type of the light homogenizing element 28 is not limited herein. The optical filter 26 may be a color wheel, for example.

More specifically, in the embodiment, the illumination system 20 includes the optical filter 26 and the light homogenizing element 28. The optical filter 26 is disposed between the wavelength conversion device 24 and the light homogenizing element 28, and the light homogenizing element 28 is disposed between the optical filter 26 and the optical device 100.

It is worth to know that, in other embodiment, locations of the optical filter 26 and the light homogenizing element 28 may be exchanged. For example, in an embodiment, the light homogenizing element 28 is disposed between the wavelength conversion device 24 and the optical filter 26, and the optical filter 26 is disposed between the light homogenizing element 28 and the optical device 100.

In addition, the light valve 30 is disposed on a transmission path of the illumination beam L3 and configured to convert the illumination beam L3 into an image beam L4. In the embodiment, the light valve 30 is disposed between the optical device 100 and the projection lens 40. The light valve 30 may include a Digital Micro-mirror Device (DMD), a Liquid-Crystal-On-Silicon (LCOS) panel, a transmissive liquid crystal panel or other beam modulator. However, position and type of the light valve 30 are not limited herein.

The projection lens 40 is disposed on a transmission path of the image beam L4 and configured to project the image beam L4 out of the projector 10. In one embodiment, the projection lens 40 is, for example, a combination of one or more optical lenses having refractive power. The optical lenses, for example, include non-planar lenses such as a biconcave lens, a biconvex lens, a concave-convex lens, a convex-concave lens, a plano-convex lens and a plano-concave lens, or various combinations thereof. However, type of the projection lens 40 is not limited herein.

Certainly, the arrangement of the optical device 100 in the projector 10 is not limited above. Referring to FIG. 1B, a main difference between the projector 10 of FIG. 1A and the projector 10' of FIG. 1B is that the optical device 100 of the illumination system 20' in the projector 10' of FIG. 1B is disposed between the light source assembly 22 and the wavelength conversion device 24. Therefore, the optical device 100 is disposed on the transmission path of the light source beam L1.

Referring to FIG. 1C, the optical device 100 of the illumination system 20" in the projector 10" of FIG. 1C is disposed between the wavelength conversion device 24 and the at least one of the optical filter 26 and the light homogenizing element 28. More specifically, the optical device 100 is disposed between the wavelength conversion device 24 and the optical filter 26. In the embodiment, the optical device 100 is disposed on the transmission path of the converted beam L2.

Figure 1D:
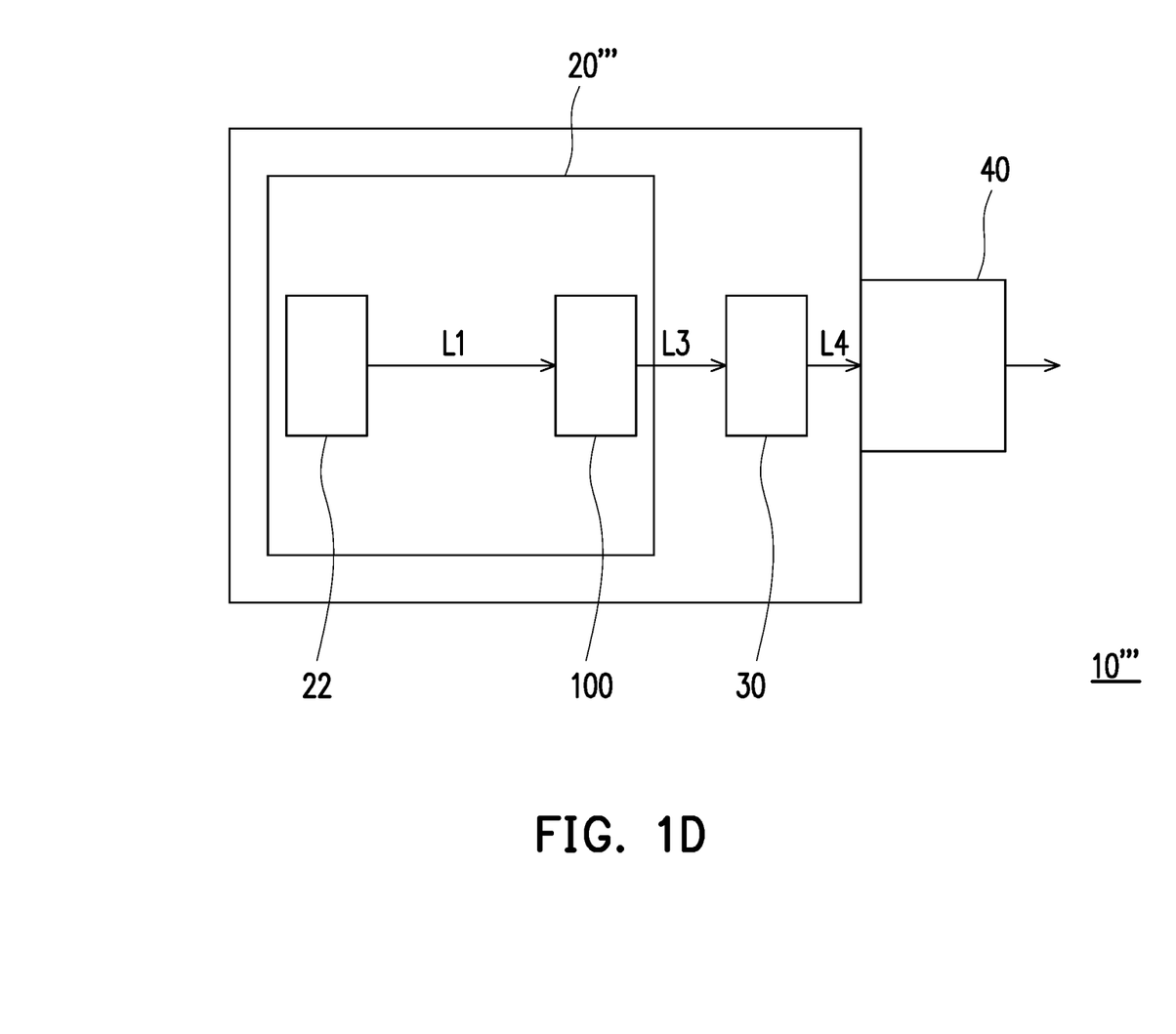

In FIG. 1D, in this embodiment of the invention, the light source assembly 22 may be a lamp in the illumination system 20'" of the projector 10'". For example, the lamp is a metal halogen bulb or a ultra-high-performance lamp, etc. Meanwhile, the optical device 100 is located between the light source assemble 22 and the light valve 30. A distance between the optical device 100 and the light valve 30 is shorter than a distance between the optical device 100 and the light source assembly 22. The optical device 100 directly transmits the illumination beam L3 to the light valve 30.

Figure 2:
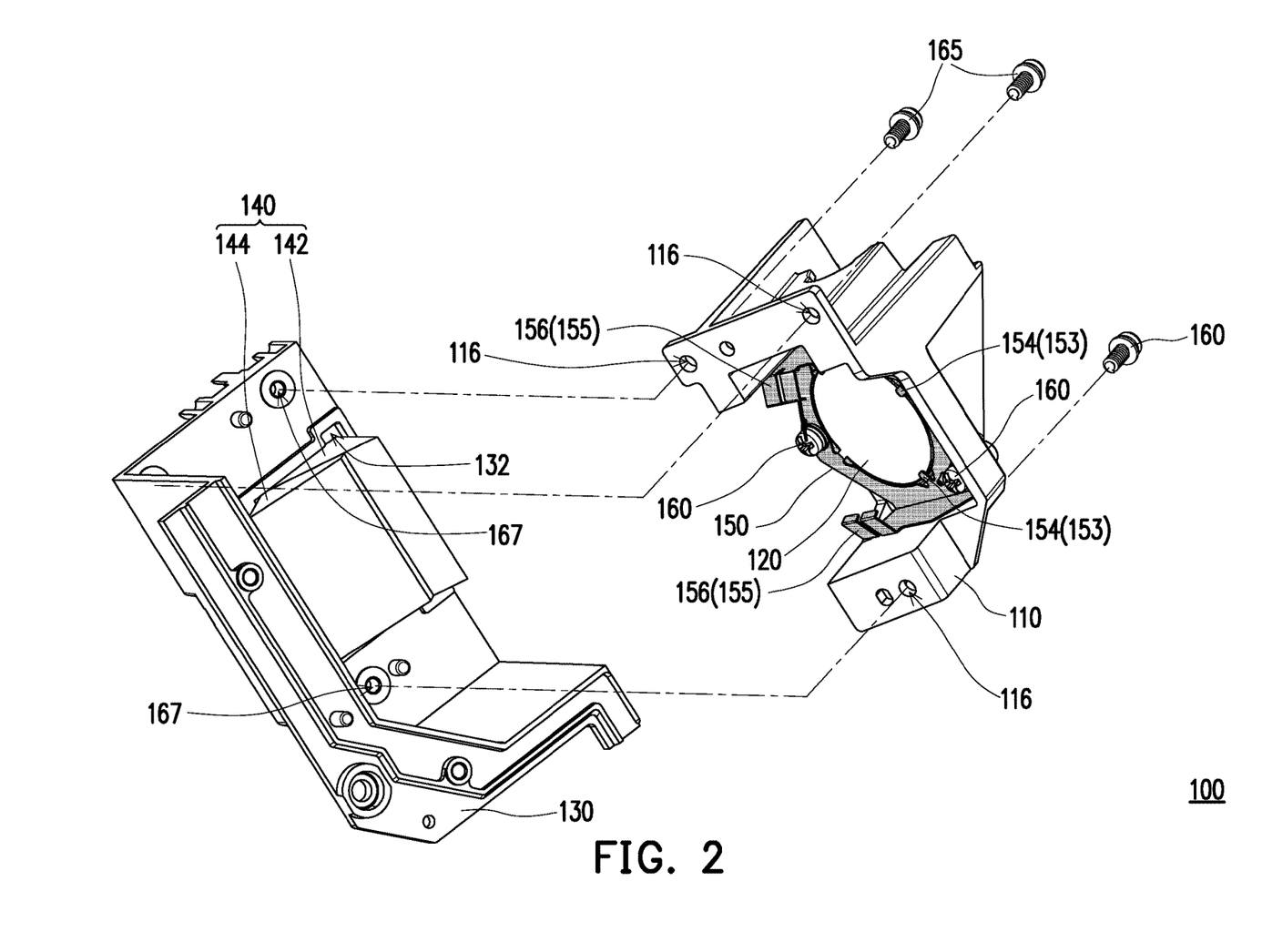
FIG. 2 is a schematic view of an optical device in accordance with an embodiment of the disclosure.
Figure 3:
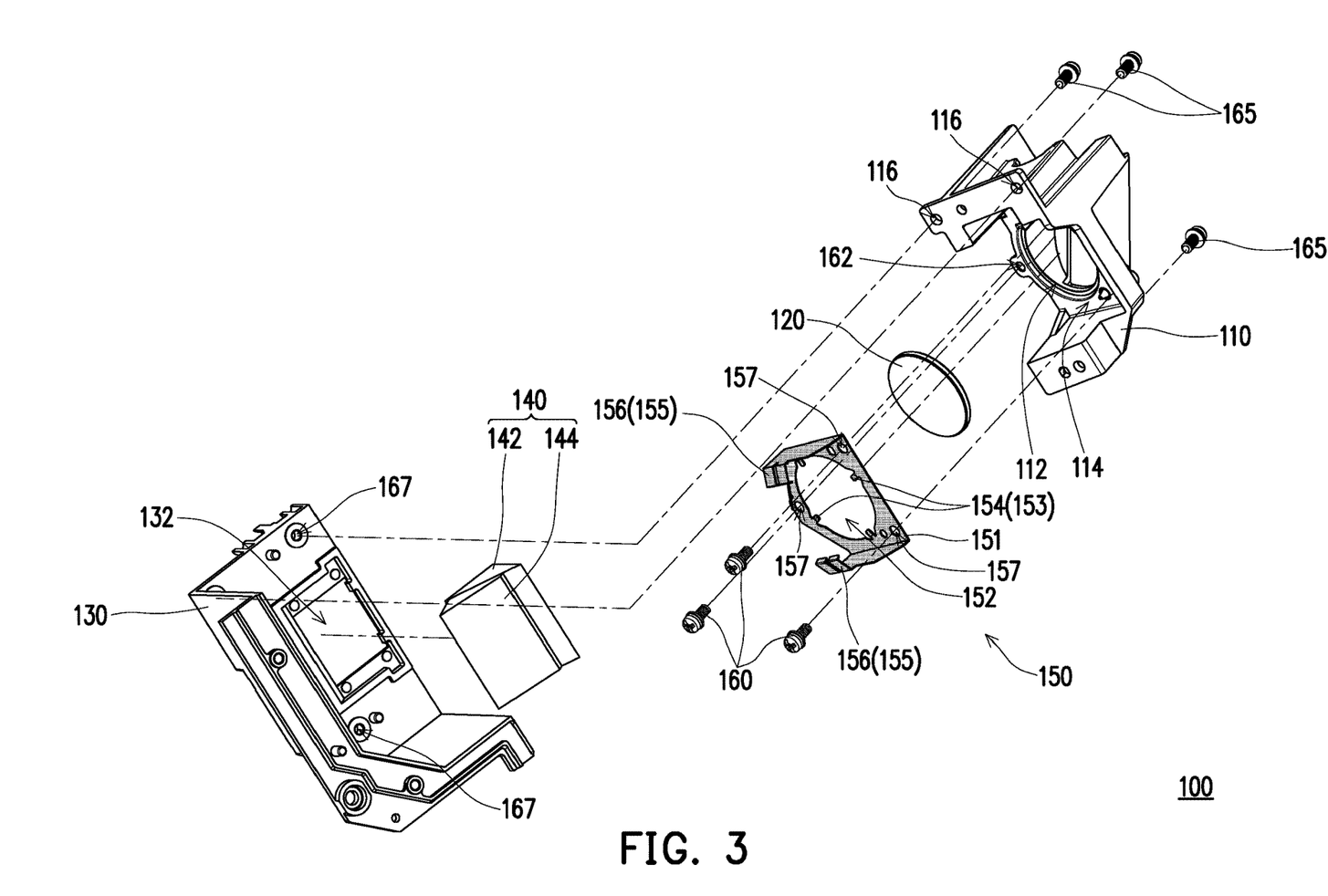
FIG. 3 is an explosive view of the optical device of FIG. 2.
Figure 4:
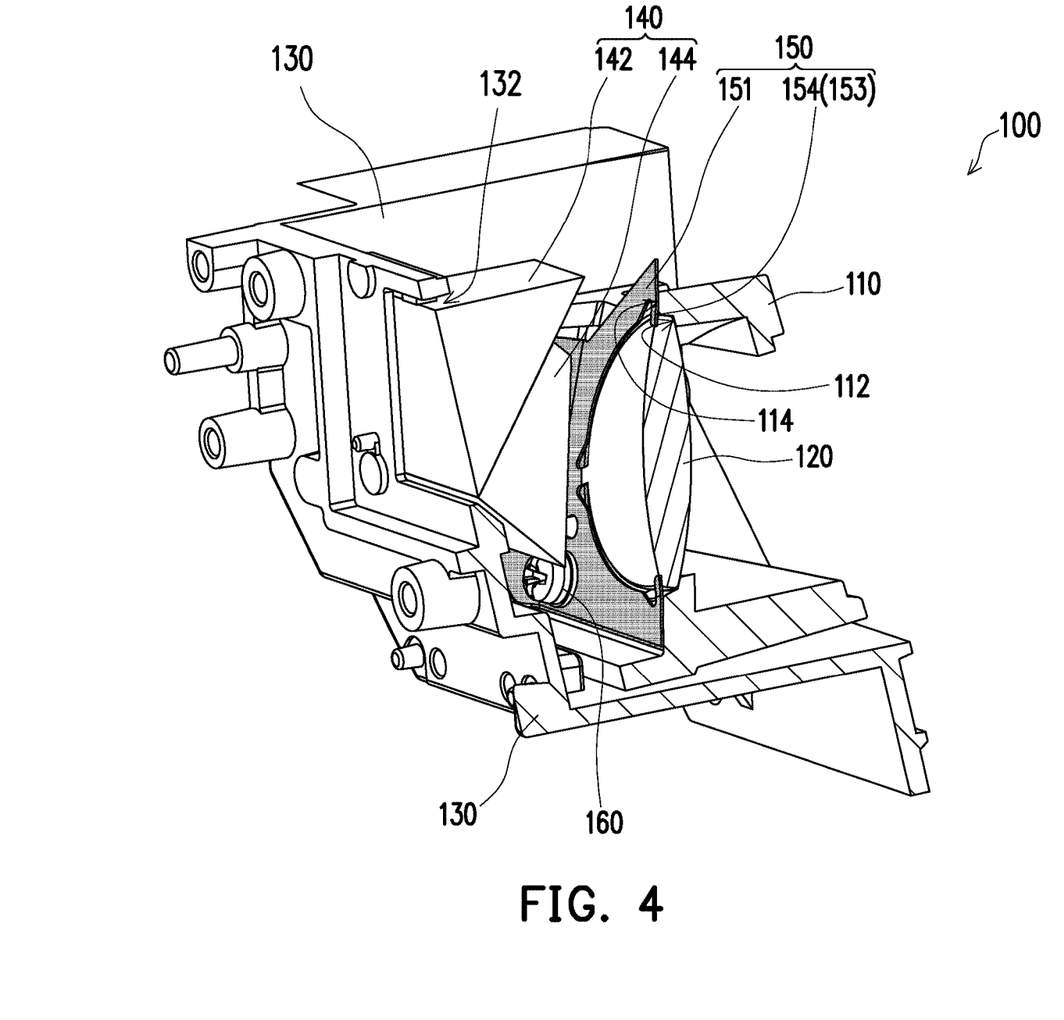
FIG. 4 is a cross-sectional view of the optical device of FIG. 2.
Figure 5:
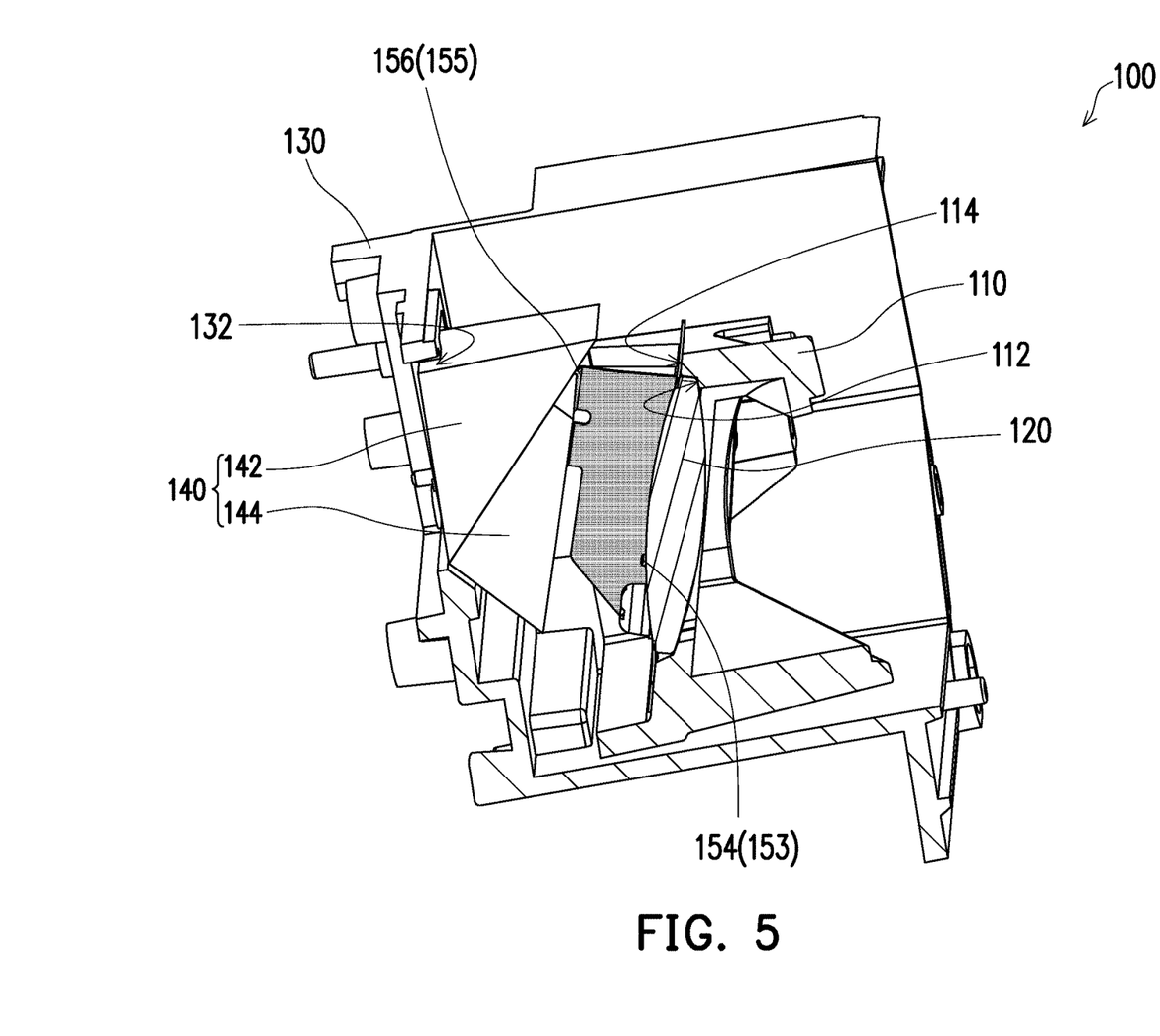
FIG. 5 is another cross-sectional view of the optical device of FIG. 2.

In the embodiments above, the optical device 100 is used for improving optical efficiency and details of the optical device 100 may be described below. FIG. 2 is a schematic view of an optical device in accordance with an embodiment of the disclosure. FIG. 3 is an explosive view of the optical device of FIG. 2. FIG. 4 is a cross-sectional view of the optical device of FIG. 2. FIG. 5 is another cross-sectional view of the optical device of FIG. 2.

Referring to FIG. 2 to FIG. 5, in the embodiment, the optical device 100 includes a first module 110, a second module 130, a first optical member 120, a second optical member 140 and a fixing member 150. In an embodiment, the first optical member 120 includes a lens, a prism, an optical filter or a light diffusion element, and the second optical member 140 includes a lens, a prism, an optical filter or a light diffusion element. More specifically, in the embodiment, the first optical member 120 includes a lens, and the second optical member 140 includes a first prism 142 and a second prism 144 partially combined to the first prism 142.

The first optical member 120 is disposed at the first module 110. The second optical member 140 is disposed at the second module 130. The second module 130 is fixed to the first module 110. The fixing member 150 is disposed between a first module 110 and a second module 130 for fixing the first optical member 120 and the second optical member 140 to the first module 110 and the second module 130.

The fixing member 150 includes a frame body 151, a first fixing structure 153 and a second fixing structure 155. In the embodiment, the frame body 151 is fixed to the first module 110. As shown in FIG. 3, the frame body 151 forms first through holes 157, and the first module 110 forms first screw holes 162. The frame body 151 is fixed to the first module 110 by first screws 160 passing through the first through holes 157 of the frame body 151 and fixed to the first screw holes 162 of the first module 110. Moreover, the first module 110 forms second through holes 116, and the second module 130 forms second screw holes 167. The first module 110 is fixed to the second module 130 by second screws 165 passing through the second through holes 116 of the first module 110 and fixed to the second screw holes 167 of the second module 130. Certainly, the fixing method is not limited above.

As shown in FIG. 4, the first fixing structure 153 is connected with the frame body 151 and configured to fix the first optical member 120 to the first module 110. In the embodiment, the first fixing structure 153 is integrated to the frame body 151, but it is not limited herein. In addition, the first module 110 includes a first concave portion 112, the fixing member 150 is fixed to a portion of the first module 110 beside the first concave portion 112 by the first screws 160, and the first optical member 120 is located in the first concave portion 112 and is pressed by the first fixing structure 153.

In detail, the frame body 151 is attached to a surface 114 of the first module 110 beside the first concave portion 112. For example, the surface 114 is around the first concave portion 112. The frame body 151 forms an opening 152 corresponding to the first concave portion 112, and the first optical member 120 is accommodated in the first concave portion 112 and exposed by the opening 152 of the frame body 151. Furthermore, the shape of the opening 152 corresponds to the shape of the first optical member 120. In the embodiment, for example, the opening 152 has a circular shape corresponding to the shape of the lens of the first optical member 120. The first fixing structure 153 further includes at least one first arm 154 extending from the frame body 151 to the opening 152 so as to press the first optical member 120. In the embodiment, the first fixing structure 153 includes four first arms 154, disposed at the frame body 151 and around the opening 152 symmetrically. However, number and configuration of the first arms 154 are not limited.

In addition, as shown in FIG. 5, the second fixing structure 155 is connected with the frame body 151 and configured to fix the second optical member 140 to the second module 130. In the embodiment, the second fixing structure 155 is integrated to the frame body 151, but it is not limited herein. In an embodiment, the second module 130 includes a second concave portion 132, and the second optical member 140 is located in the second concave portion 132 and is pressed by the second fixing structure 155. Specifically, the second fixing structure 155 includes at least one second arm 156 extending from the frame body 151 and bending so as to form a pressing portion to press the second optical member 140. As shown in FIG. 3, in the embodiment, the second fixing structure 155 includes four second arms 156, two of the second arms 156 form one pair, the other two of the second arms 156 form the other pair, and the two pairs are disposed at the frame body 151 symmetrically. However, number and configuration of the second arms 156 are not limited.

In the embodiment, the fixing member 150 disposed between the first module 110 and the second module 130 is capable of fixing the first optical member 120 and the second optical member 140 to the first module 110 and the second module 130 by the first fixing structure 153 and the second fixing structure 155. Compared to the conventional device which needs two separate fixing members to fix the first optical member 120 and the second optical member 140 to the first module 110 and the second module 130 respectively, in the embodiment, the single fixing member 150 can fix the first optical member 120 and the second optical member 140 to the first module 110 and the second module 130 at the same time, so that the number of the elements of the optical device 100 can be reduced, production cost and working time of fixing procedure can be saved.

Figure 6:
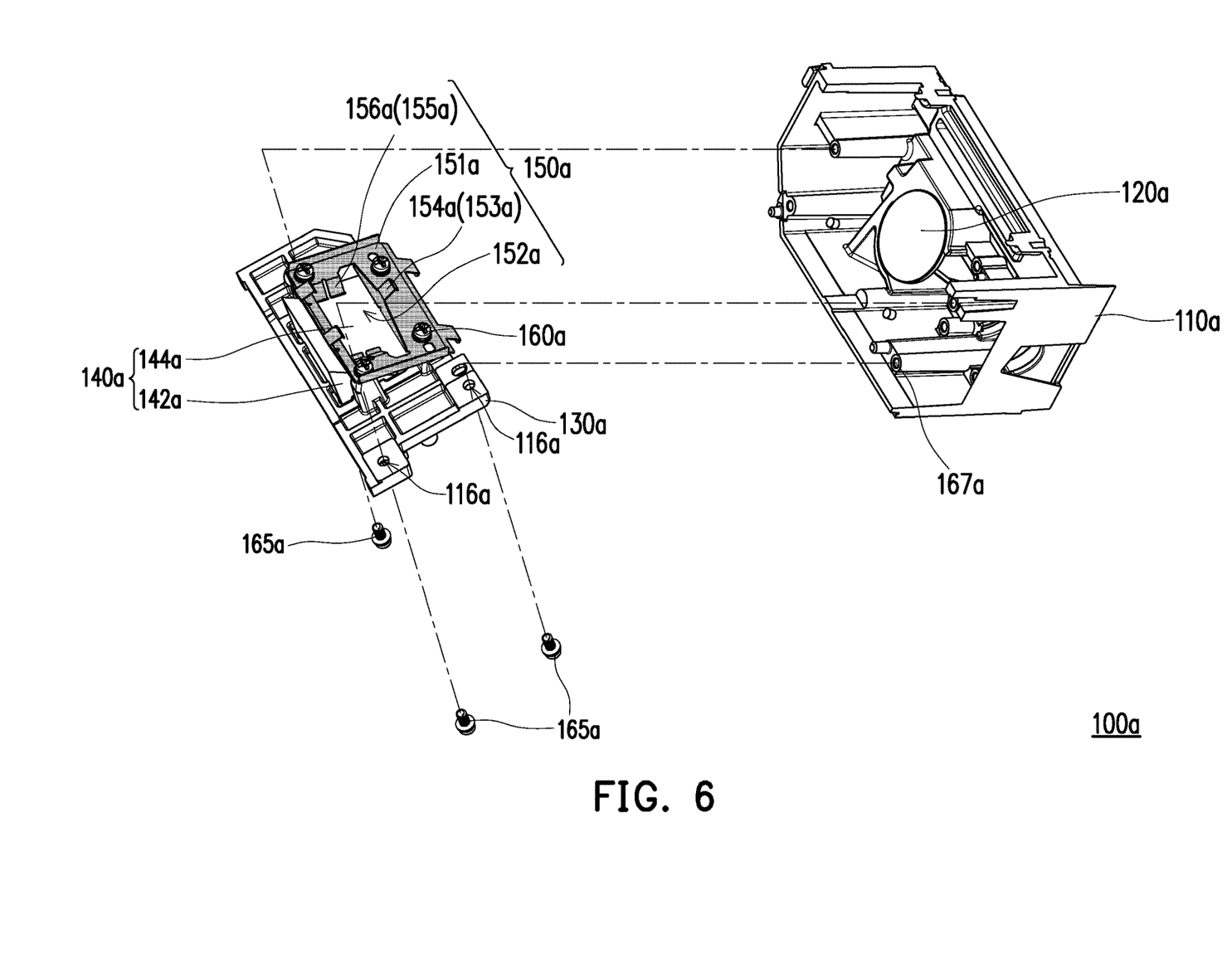
FIG. 6 is a schematic view of an optical device in accordance with another embodiment of the disclosure.
Figure 7:
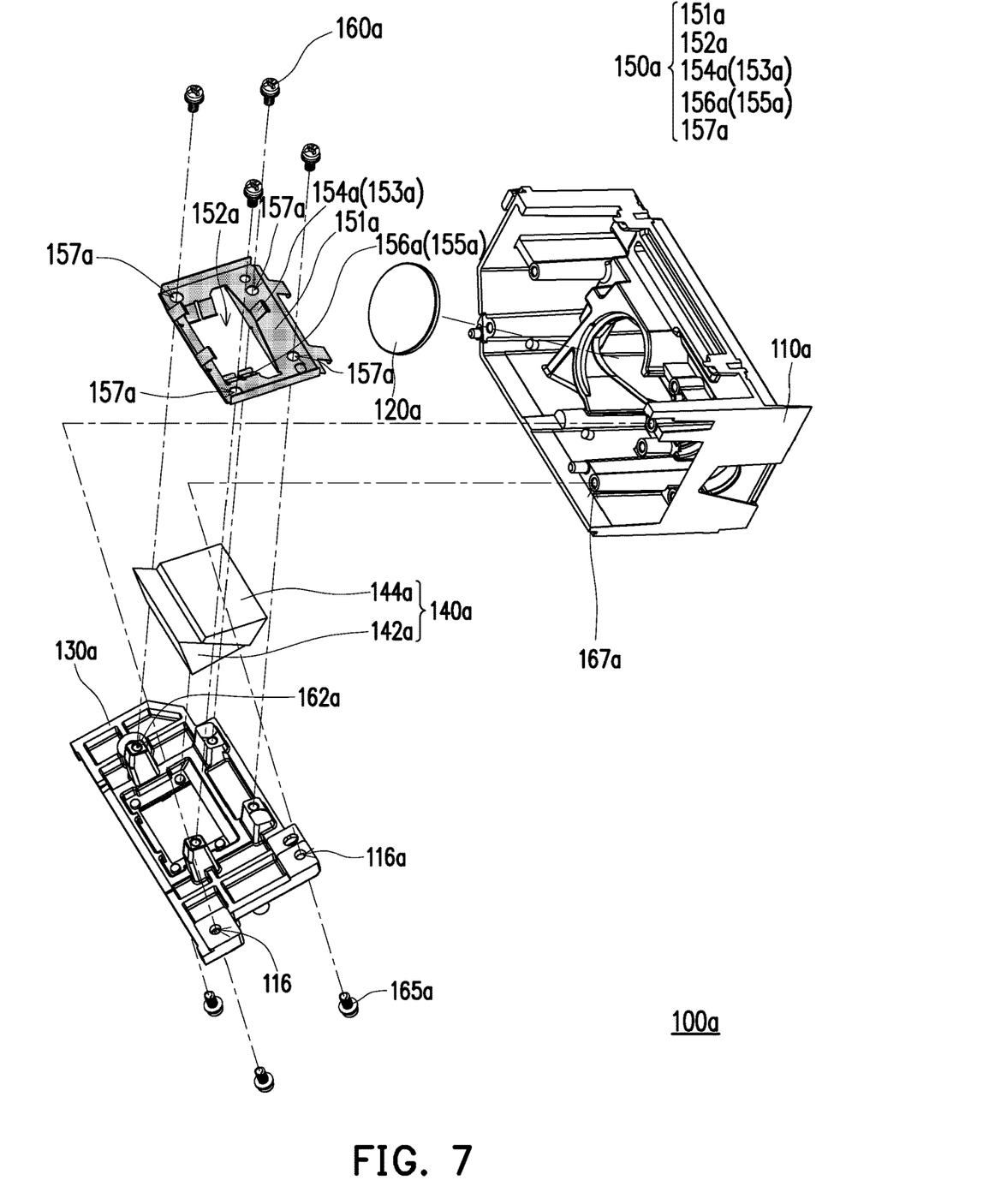
FIG. 7 is an explosive view of the optical device of FIG. 6.
Figure 8:
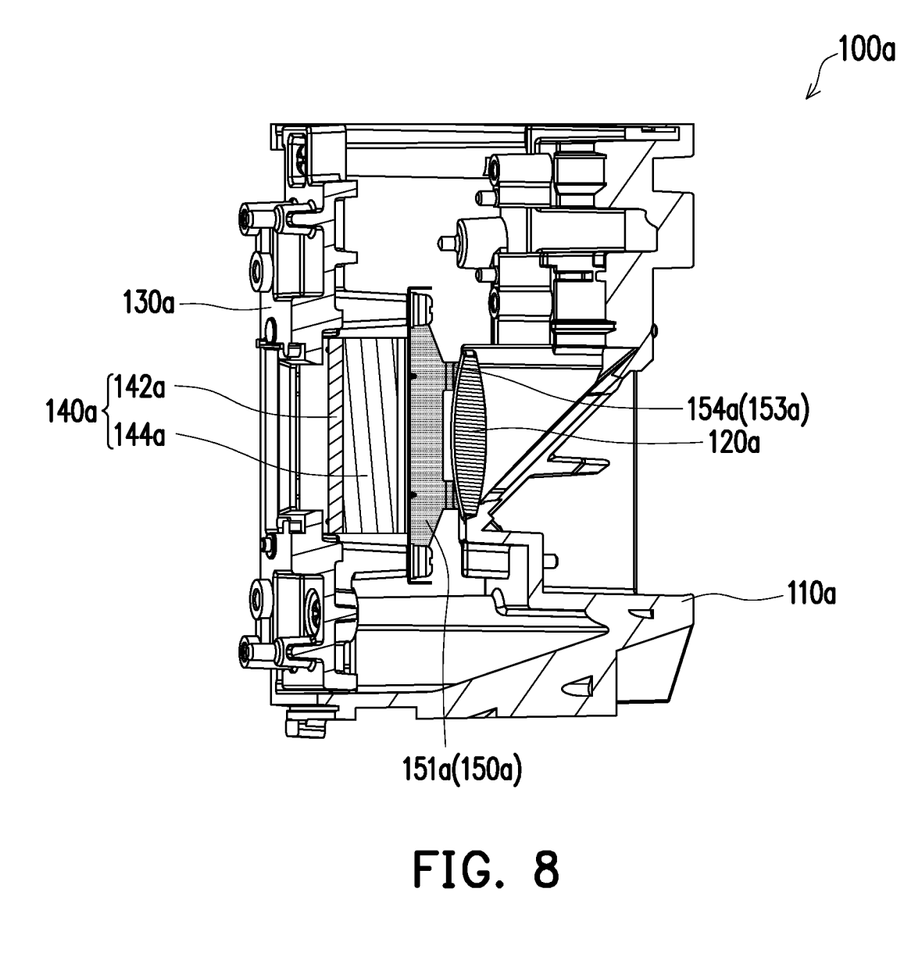
FIG. 8 is a cross-sectional view of the optical device of FIG. 6.
Figure 9:
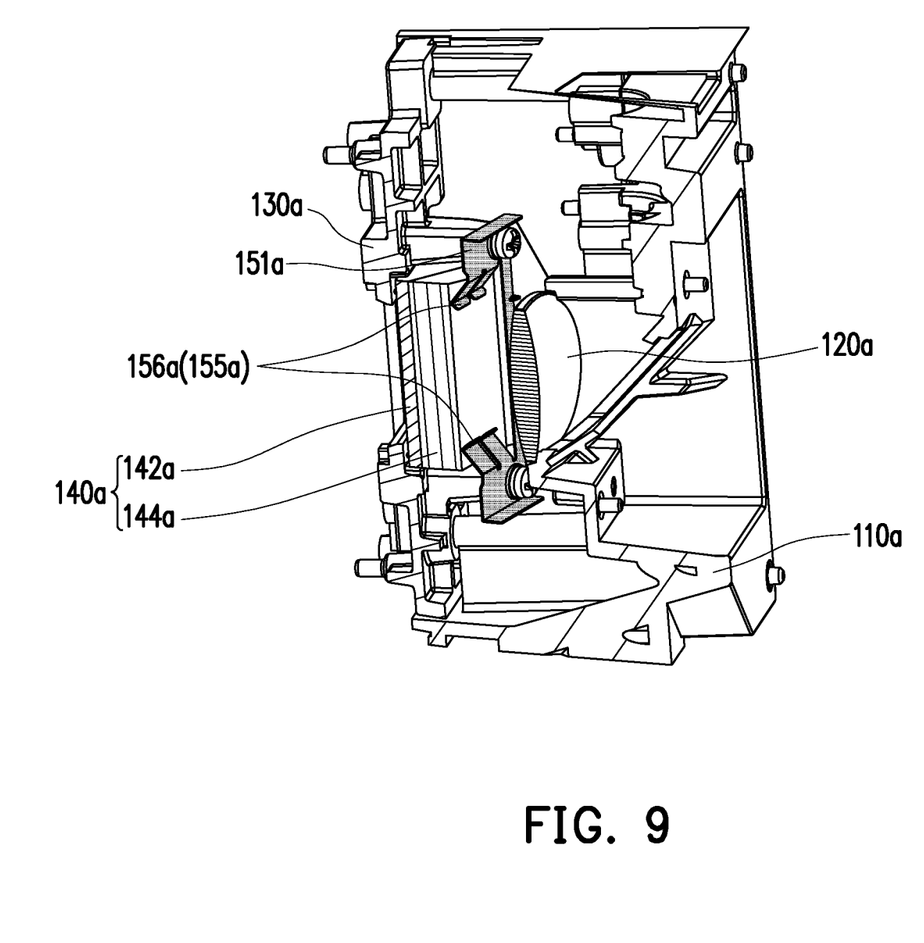
FIG. 9 is another cross-sectional view of the optical device of FIG. 6.

FIG. 6 is a schematic view of an optical device in accordance with another embodiment of the disclosure. FIG. 7 is an explosive view of the optical device of FIG. 6. FIG. 8 is a cross-sectional view of the optical device of FIG. 6. FIG. 9 is another cross-sectional view of the optical device of FIG. 6. Referring to FIG. 6 to FIG. 9, the main difference between the optical device 100a of FIG. 6 and optical device 100 of FIG. 2 is that, in this embodiment, the frame body 151a of the fixing member 150a is fixed to the first module 130a. Besides, the first optical member 140a includes a first prism 142a and a second prism 144a partially combined to the first prism 142a, and the second optical member 120a includes a lens. Furthermore, the shape of the opening 152a of the frame body 151a of the fixing member 150a corresponds to the shape of the first optical member 140a. In the embodiment, for example, the opening 152a has a rectangular shape corresponding to the shape of one rectangular face of the second prism 144a of the first optical member 140a.

As shown in FIG. 7, the first screw holes 162a are formed in the first module 130a, and the first screws 160a pass through the first through holes 157a of the fixing member 150a and are fixed to the first screw holes 162a of the frame body 151a. In addition, the second screw holes 167a are formed in the second module 110a, and the first module 130a forms second through holes 116a, the second screws 165a pass through the second through holes 116a of the first module 130a and are fixed to the second screw holes 167a of the second module 110a.

Similarly, the fixing member 150a is disposed between the first module 130a and the second module 110a, and is capable of fixing the first optical member 140a and the second optical member 120a to the first module 130a and the second module 110a by the first fixing structure 155a and the second fixing structure 153a. More specifically, the first optical member 140a is fixed between the first module 130a and the first arms 156a of the first fixing structure 155a, and the second optical member 120a is fixed between the second module 110a and the second arms 154a of the second fixing structure 153a. Therefore, one single fixing member 150a is needed to be disposed between the first module 130a and the second module 110a so as to reduce element number in the optical device 100a.

Based on the above, the fixing member disposed between the first module and the second module is adapted to fix the first optical member and the second optical member to the first module and the second module by the first fixing structure and the second fixing structure. Compared to the conventional device which needs two fixing members to fix the first optical member and the second optical member to the first module and the second module respectively, the single fixing member in the disclosure can fix the first optical member and the second optical member to the first module and the second module at the same time so that production cost and working time of fixing procedure can be saved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A fixing member adapted to fix a first optical member and a second optical member, wherein the fixing member is disposed between a first module and a second module, and the fixing member comprises:
   a frame body, fixed to the first module;
   a first fixing structure, connected with the frame body and configured to fix the first optical member to the first module; and
   a second fixing structure, connected with the frame body and configured to fix the second optical member to the second module, wherein the frame body forms an opening, and the first optical member is exposed by the opening,
   wherein the second module comprises a second concave portion, the second optical member is located in the second concave portion and is pressed by the second fixing structure,
   wherein the second fixing structure comprises at least one second arm extending from the frame body and bending so as to form a pressing portion to press the second optical member.

2. The fixing member according to claim 1, wherein the first module comprises a first concave portion, the fixing member is fixed to a portion of the first module beside the first concave portion, and the first optical member is located in the first concave portion and is pressed by the first fixing structure.

3. The fixing member according to claim 2, wherein the frame body is attached to a surface of the first module beside the first concave portion, the opening corresponds to the first concave portion, the first optical member is accommodated in the first concave portion, and the first fixing structure further comprises at least one first arm extending from the frame body to the opening so as to press the first optical member.

4. A fixing member adapted to fix a first optical member and a second optical member, wherein the fixing member is disposed between a first module and a second module, and the fixing member comprises:
   a frame body, fixed to the first module;
   a first fixing structure, connected with the frame body and configured to fix the first optical member to the first module; and
   a second fixing structure, connected with the frame body and configured to fix the second optical member to the second module, wherein the frame body forms an opening, and the first optical member is exposed by the opening,
   wherein the first optical member comprises a lens, a prism, an optical filter or a light diffusion element.

5. A fixing member adapted to fix a first optical member and a second optical member, wherein the fixing member is disposed between a first module and a second module, and the fixing member comprises:
   a frame body, fixed to the first module;
   a first fixing structure, connected with the frame body and configured to fix the first optical member to the first module; and
   a second fixing structure, connected with the frame body and configured to fix the second optical member to the second module, wherein the frame body forms an opening, and the first optical member is exposed by the opening,
   wherein the second optical member comprises a lens, a prism, an optical filter or a light diffusion element.

6. A projector, comprising:
   an illumination system, configured to provide an illumination beam;
   a light valve, disposed on a transmission path of the illumination beam and configured to convert the illumination beam into an image beam; and
   a projection lens, disposed on a transmission path of the image beam and configured to project the image beam out of the projector, wherein the illumination system comprises:
      a light source assembly, configured to provide a light source beam; and
      an optical device, disposed between the light source assembly and the light valve, wherein the optical device comprises:
         a first module;
         a second module, fixed to the first module;
         a first optical member, disposed at the first module;
         a second optical member, disposed at the second module; and
         a fixing member, disposed between the first module and the second module, wherein the fixing member comprises:
            a frame body, fixed to the first module;
            a first fixing structure, connected with the frame body and configured to fix the first optical member to the first module; and
            a second fixing structure, connected with the frame body and configured to fix the second optical member to the second module, wherein the frame body forms an opening, and the first optical member is exposed by the opening,
         wherein the second module comprises a second concave portion, the second optical member is located in the second concave portion and is pressed by the second fixing structure,
         wherein the second fixing structure comprises at least one second arm extending from the frame body and bending so as to form a pressing portion to press the second optical member.

7. The projector according to claim 6, wherein the illumination system further comprises a wavelength conversion device disposed on a transmission path of the light source beam, and the wavelength conversion device converts the light source beam into a converted beam.

8. The projector according to claim 7, wherein the optical device is disposed between the light source assembly and the wavelength conversion device.

9. A projector, comprising:
   an illumination system, configured to provide an illumination beam;
   a light valve, disposed on a transmission path of the illumination beam and configured to convert the illumination beam into an image beam; and
   a projection lens, disposed on a transmission path of the image beam and configured to project the image beam out of the projector, wherein the illumination system comprises:
      a light source assembly, configured to provide a light source beam; and
      an optical device, disposed between the light source assembly and the light valve, wherein the optical device comprises:
         a first module;
         a second module, fixed to the first module;
         a first optical member, disposed at the first module;

a second optical member, disposed at the second module; and a fixing member, disposed between the first module and the second module, wherein the fixing member comprises:
- a frame body, fixed to the first module;
- a first fixing structure, connected with the frame body and configured to fix the first optical member to the first module; and
- a second fixing structure, connected with the frame body and configured to fix the second optical member to the second module, wherein the frame body forms an opening, and the first optical member is exposed by the opening, wherein the illumination system further comprises a wavelength conversion device disposed on a transmission path of the light source beam, and the wavelength conversion device converts the light source beam into a converted beam, wherein the illumination system further comprises at least one of an optical filter and a light homogenizing element disposed on a path of the converted beam so as to form the illumination beam.

10. The projector according to claim 9, wherein the at least one of the optical filter and the light homogenizing element is disposed between the wavelength conversion device and the optical device.

11. The projector according to claim 9, wherein the optical device is disposed between the wavelength conversion device and the at least one of the optical filter and the light homogenizing element.

12. The projector according to claim 6, wherein the first module comprises a first concave portion, the fixing member is fixed to a portion of the first module beside the first concave portion, and the first optical member is located in the first concave portion and is pressed by the first fixing structure.

13. The projector according to claim 12, wherein the frame body is attached to a surface of the first module beside the first concave portion, the opening corresponds to the first concave portion, the first optical member is accommodated in the first concave portion, and the first fixing structure further comprises at least one first arm extending from the frame body to the opening so as to press the first optical member.

14. The projector according to claim 6, wherein the first optical member comprises a lens, a prism, an optical filter or a light diffusion element.

15. The projector according to claim 6, wherein the second optical member comprises a lens, a prism, an optical filter or a light diffusion element.

* * * * *